United States Patent
Huang et al.

(10) Patent No.: US 7,523,355 B2
(45) Date of Patent: Apr. 21, 2009

(54) METHOD AND APPARATUS FOR OUTAGE MEASUREMENT

(75) Inventors: Jiandong Huang, San Jose, CA (US); Sejun Song, Danville, CA (US); Madhav Marathe, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/534,908

(22) Filed: Sep. 25, 2006

(65) Prior Publication Data

US 2007/0028147 A1 Feb. 1, 2007

Related U.S. Application Data

(63) Continuation of application No. 10/209,845, filed on Jul. 30, 2002, now Pat. No. 7,149,917.

(51) Int. Cl.
G06F 11/00 (2006.01)
(52) U.S. Cl. .................... 714/43; 714/4; 714/47
(58) Field of Classification Search .............. 714/4, 714/43, 47
See application file for complete search history.

(56) References Cited

U.S. PATENT DOCUMENTS

| | | | |
|---|---|---|---|
| 5,452,287 A | 9/1995 | DiCecco et al. | |
| 5,627,766 A | 5/1997 | Beaven | |
| 5,646,864 A | 7/1997 | Whitney | |
| 5,710,885 A | 1/1998 | Bondi | |
| 5,761,502 A | 6/1998 | Jacobs | |
| 5,790,431 A | 8/1998 | Ahrens et al. | |
| 5,802,286 A | 9/1998 | Dere et al. | |
| 5,822,578 A | 10/1998 | Frank et al. | |
| 5,832,196 A | 11/1998 | Croslin et al. | |
| 5,845,081 A | 12/1998 | Rangarajan et al. | |
| 5,864,662 A | 1/1999 | Brownmiller et al. | |
| 5,892,753 A | 4/1999 | Badt et al. | |
| 5,909,549 A | 6/1999 | Compliment et al. | |
| 5,968,126 A | 10/1999 | Ekstrom et al. | |
| 6,000,045 A | 12/1999 | Lewis | |
| 6,021,507 A | 2/2000 | Chen | |
| 6,134,671 A | 10/2000 | Commerford et al. | |
| 6,212,171 B1 | 4/2001 | LaFollette et al. | |
| 6,226,681 B1 | 5/2001 | Koga et al. | |
| 6,253,339 B1 | 6/2001 | Tse et al. | |

(Continued)

FOREIGN PATENT DOCUMENTS

EP 1150455 10/2001

OTHER PUBLICATIONS

Talpade et al., "Nomad: Traffic-based Network Monitoring Framework for Anomaly Detection", pp. 442-451, 1999 IEEE.

(Continued)

*Primary Examiner*—Christopher S McCarthy
(74) *Attorney, Agent, or Firm*—Stolowitz Ford Cowger LLP

(57) ABSTRACT

An Outage Measurement System (OMS) monitors and measures outage data at a network processing device. The outage data can be stored in the device and transferred to a Network Management System (NMS) or other correlation tool for deriving outage information. The OMS automates the outage measurement process and is more accurate, efficient and cost effective than previous outage measurement systems.

21 Claims, 12 Drawing Sheets

U.S. PATENT DOCUMENTS

| | | | |
|---|---|---|---|
| 6,269,099 | B1 | 7/2001 | Borella et al. |
| 6,269,330 | B1 | 7/2001 | Cidon et al. |
| 6,337,861 | B1 | 1/2002 | Rosen |
| 6,430,712 | B2 | 8/2002 | Lewis |
| 6,438,707 | B1 | 8/2002 | Ronstrom |
| 6,594,786 | B1 | 7/2003 | Connelly et al. |
| 6,747,957 | B1 * | 6/2004 | Pithawala et al. ........... 370/252 |
| 6,816,813 | B2 | 11/2004 | Tan et al. |
| 6,830,515 | B2 | 12/2004 | Rowe |
| 6,966,015 | B2 | 11/2005 | Steinberg et al. |
| 2001/0013107 | A1 | 8/2001 | Lewis |
| 2002/0032769 | A1 | 3/2002 | Barkai et al. |
| 2002/0143920 | A1 | 10/2002 | Dev et al. |
| 2002/0191624 | A1 | 12/2002 | Onweller et al. |
| 2003/0065986 | A1 | 4/2003 | Fraenkel et al. |
| 2003/0115508 | A1 | 6/2003 | Ali et al. |
| 2003/0149919 | A1 | 8/2003 | Greenwald et al. |
| 2003/0172153 | A1 | 9/2003 | Vaver |
| 2003/0191989 | A1 | 10/2003 | O'Sullivan |
| 2003/0204786 | A1 | 10/2003 | Dinker et al. |
| 2003/0212928 | A1 | 11/2003 | Srivastava et al. |
| 2004/0015619 | A1 | 1/2004 | Brown et al. |
| 2004/0078695 | A1 | 4/2004 | Bowers et al. |
| 2004/0153835 | A1 | 8/2004 | Song et al. |
| 2004/0203440 | A1 | 10/2004 | Katz |
| 2004/0230872 | A1 | 11/2004 | Mullally et al. |
| 2005/0216784 | A1 | 9/2005 | Srinivasan et al. |
| 2005/0216785 | A1 | 9/2005 | Suzuki et al. |
| 2006/0059253 | A1 * | 3/2006 | Goodman et al. ........... 709/223 |
| 2006/0143547 | A1 * | 6/2006 | Haaks et al. .................. 714/47 |
| 2006/0149992 | A1 * | 7/2006 | Shima ........................... 714/4 |
| 2006/0242453 | A1 * | 10/2006 | Kumar et al. .................. 714/4 |
| 2007/0016831 | A1 * | 1/2007 | Gehman et al. ............... 714/43 |
| 2007/0140133 | A1 * | 6/2007 | Gudipalley et al. ......... 370/242 |

OTHER PUBLICATIONS

IBM Technical Disclosure Bulletin, "Dynamic Load Sharing for Distributed Computing Environment", pp. 511-515, vol. 38, No. 7, Jul. 1995.

Cisco Technologies; RFC 2863 (65 pages).

Cisco Technologies; RFC 2819 (92 pages).

Cisco Technologies; RFC 2737 (53 pages).

Cisco Technologies; RFC 1443 (31 pages).

http://www.cisco.com/univercd/cc/td/doc/product/fhubs/fh300mib/mibcdp.htm (4 pages).

Cisco Systems, Inc. "Cisco IOS Service Assurance Agent Data Sheet" (5 pages).

Cisco Systems, Inc. "Scalable Performance Monitoring Enables SLA Enforcement, New Service Delivery" (3 pages).

Cisco Systems, Inc. "Service Assurance Agent FAQ" (17 pages).

Cisco Systems, Inc. "Cisco Service Assurance Agent User Guide" (18 pages).

Cisco Systems, Inc. "Cisco Service Assurance Agent Documentation" (38 pages).

Cisco Systems., Inc. "Using Cisco Service Assurance Agent and Internetwork Performance Monitor to Manage Quality of Service in Voice over IP Networks" (10 pages).

Cisco Systems, Inc. "Service Assurance Agent Enhancements" (34 pages).

Cisco Systems, Inc. "Measuring Delay, Jitter, and Packet Loss with Cisco IOS SAA and RTTMON" (10 pages).

Cisco Systems, Inc. "Network Management System: Best Practices White Paper" (26 pages).

Cisco Systems, Inc. "Network Monitoring Using Cisco Service Assurance Agent" (34 pages).

Cisco Systems, Inc. "Cisco Service Assurance Agent Commands" (84 pages).

Cisco Systems., Inc. "SA Agent Support for Frame Relay, VoIP, and MPLS VPN Monitoring" (20 pages).

Cisco Systems., Inc. "SA Agent Application Performance Monitor" (26 pages).

Ali, "Analysis of Total Outage Data for Stored Program Control Switching Systems", 1986, IEEE, pp. 1044-1046.

* cited by examiner

METHOD AND APPARATUS FOR OUTAGE MEASUREMENT

CROSS REFERENCE TO RELATED APPLICATIONS

This application is a continuation of U.S. patent application Ser. No. 10/209,845, filed on Jul. 30, 2002, now pending, the disclosure of which is herein incorporated by reference.

BACKGROUND

High availability is a critical system requirement in Internet Protocol (IP) networks and other telecommunication networks for supporting applications such as telephony, video conferencing, and on-line transaction processing. Outage measurement is critical for assessing and improving network availability. Most Internet Service Providers (ISPs) conduct outage measurements using automated tools such as Network Management System (NMS)-based polling or manually using a trouble ticket database.

Two outage measurement metrics have been used for measuring network outages: network device outage and customer connectivity downtime. Due to scalability limitations, most systems only provide outage measurements up to the ISP's access routers. Any outage measurements and calculations between the access routers and customer equipment have to be performed manually. As networks get larger, this process becomes more tedious, time-consuming, error-prone, and costly.

Present outage measurement schemes also do not adequately address the need for accuracy, scalability, performance, cost efficiency, and manageability. One reason is that end-to-end network monitoring from an outage management server to customer equipment introduces overhead on the network path and thus has limited scalability. The multiple hops from an outage management server to customer equipment also decreases measurement accuracy. For example, some failures between the management server and customer equipment may not be caused by customer connectivity outages but alternatively caused by outages elsewhere in the IP network. Outage management server-based monitoring tools also require a server to perform network availability measurements and also require ISPs to update or replace existing outage management software.

Several existing Management Information Bases (MIBs), including Internet Engineering Task Force (IETF) Interface MIB, IETF Entity MIB, and other Entity Alarm MIBs, are used for object up/down state monitoring. However, these MIBs do not keep track of outage data in terms of accumulated outage time and failure count per object and lack a data storage capability that may be required for certain outage measurements.

The present invention addresses this and other problems associated with the prior art.

SUMMARY OF THE INVENTION

An Outage Measurement System (OMS) monitors and measures outage data at a network processing device. The outage data can be transferred to a Network Management System (NMS) or other correlation tool for deriving outage information. The outage data is stored in an open access data structure, such as an Management Information Base (MIB), that allows either polling or provides notification of the outage data for different filtering and correlation tools. The OMS automates the outage measurement process and is more accurate, efficient and cost effective than previous outage measurement systems.

The foregoing and other objects, features and advantages of the invention will become more readily apparent from the following detailed description of a preferred embodiment of the invention which proceeds with reference to the accompanying drawings.

DETAILED DESCRIPTION

Figure 1:
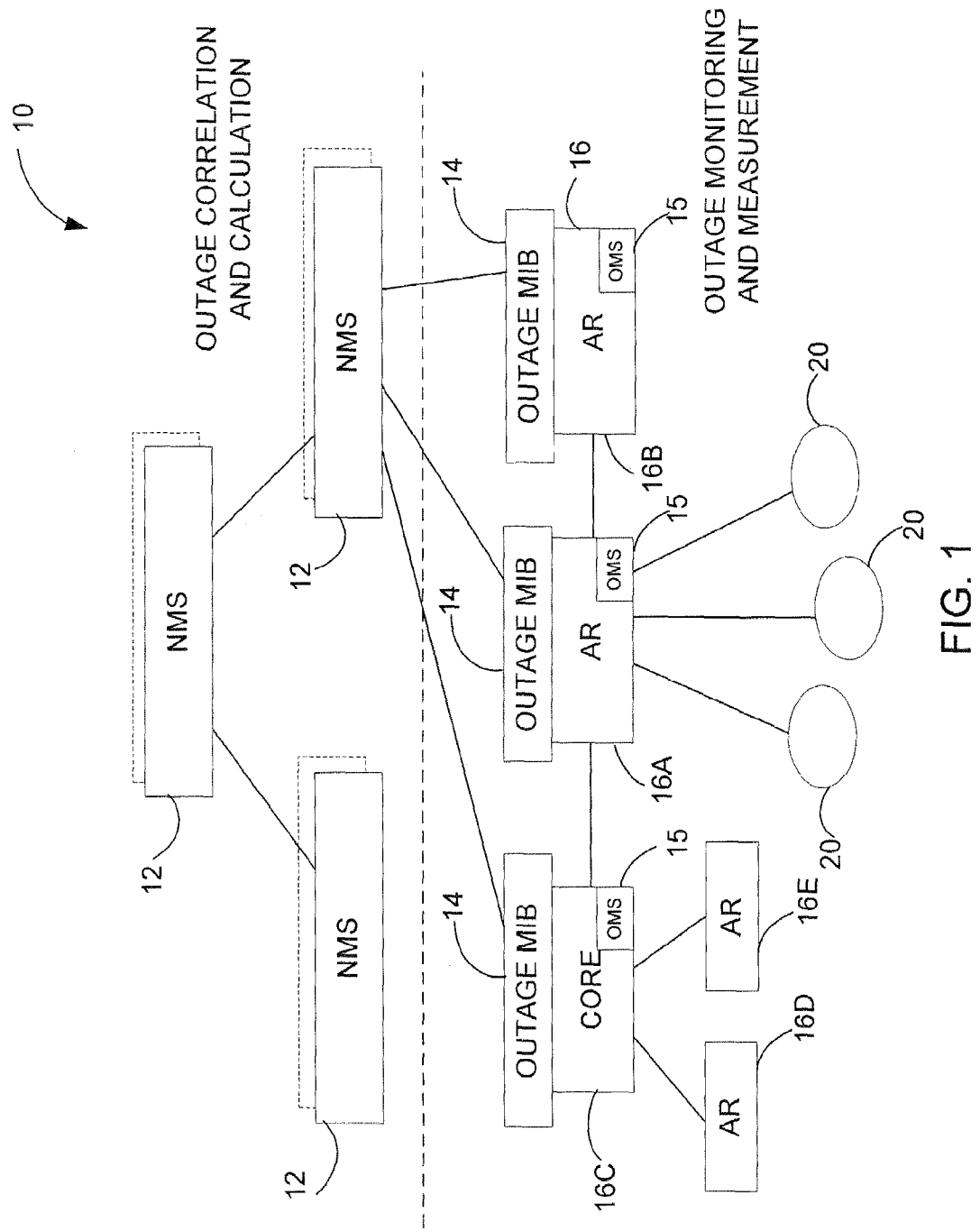
FIG. 1 is a diagram showing a network using an Outage Measurement System (OMS).

FIG. 1 shows an IP network 10 including one or more Outage Measurement Systems (OMSs) 15 located in different network processing devices 16. In one example, the network processing devices 16 are access routers 16A and 16B, switches or core routers 16C. However, these are just examples and the OMS 15 can be located in any network device that requires outage monitoring and measurement. Network Management Systems (NMSs) 12 are any server or other network processing device located in network 10 that processes the outage data generated by the OMSs 15.

Access router 16A is shown connected to customer equipment 20 and another access router 16B. The customer equipment 20 in this example are routers but can be any device used for connecting endpoints (not shown) to the IP network 10. The endpoints can be any personal computer, Local Area Network (LANs), T1 line, or any other device or interface that communicates over the IP network 10.

A core router 16C is shown coupled to access routers 16D and 16E. But core router 16C represents any network processing device that makes up part of the IP network 10. For simplicity, routers, core routers, switches, access routers, and other network processing devices are referred to below generally as "routers" or "network processing devices".

In one example, the OMS 15 is selectively located in network processing devices 16 that constitute single point of failures in network 10. A single point of failure can refer to any network processing device, link or interface that comprises a single path for a device to communicate over network 10. For example, access router 16A may be the only device available for customer equipment 20 to access network 10. Thus, the access router 16A can be considered a single point of failure for customer routers 20.

The OMSs 15 in routers 16 conduct outage monitoring and measurements. The outage data from these measurements is then transferred to the NMS 12. The NMS 12 then correlates the outage data and calculates different outage statistics and values.

Figure 2:
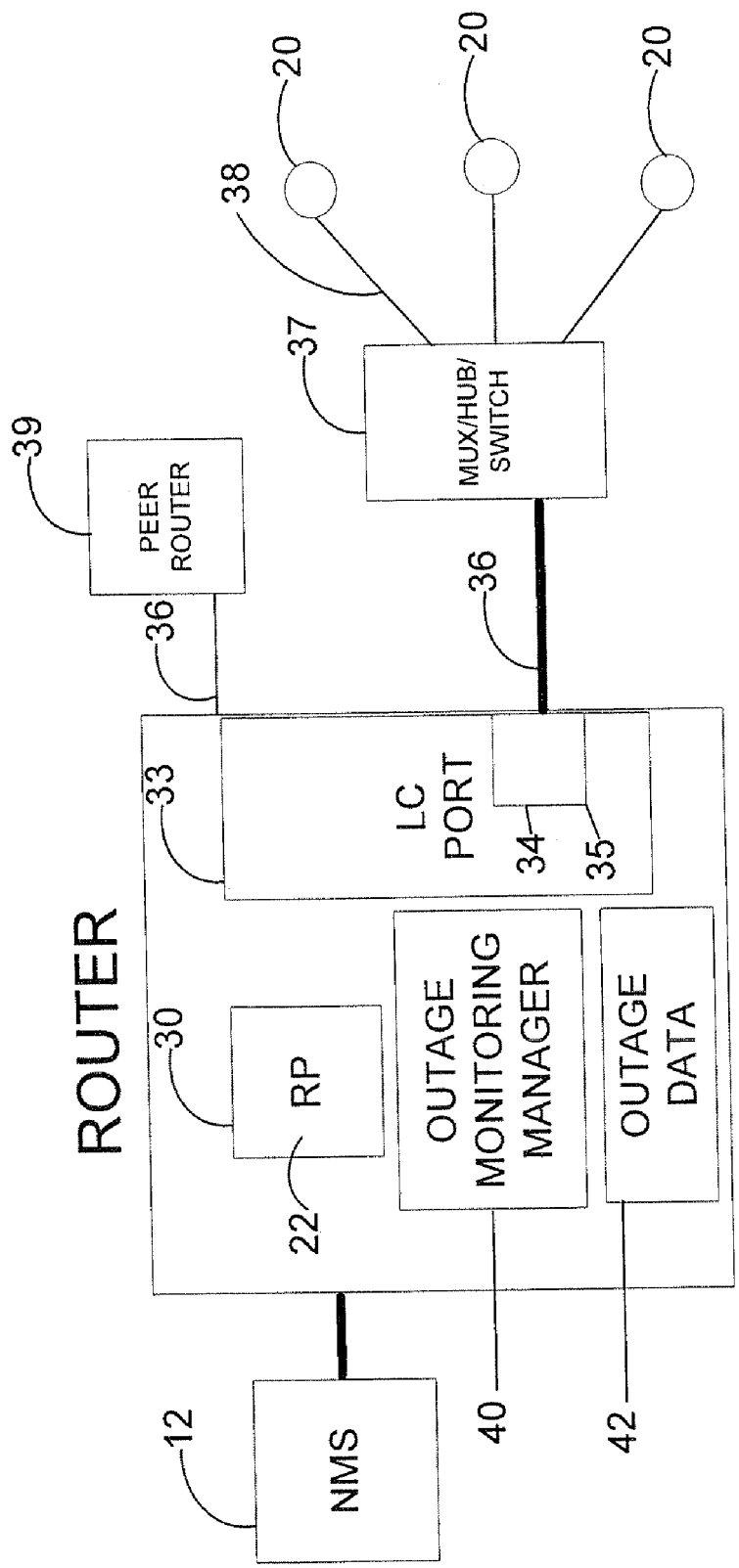
FIG. 2 is a block diagram showing some of the different outages that can be detected by the OMS.

FIG. 2 identifies outages that are automatically monitored and measured by the OMS 15. These different types of outages include a failure of the Router Processor (RP) 30. The RP failure can include a Denial OF Service (DOS) attack 22 on the processor 30. This refers to a condition where the processor 30 is 100% utilized for some period of time causing a denial of service condition for customer requests. The OMS 15 also detects failures of software processes that may be operating in network processing device.

The OMS 15 can also detect a failure of line card 33, a failure of one or more physical interfaces 34 (layer-2 outage) or a failure of one or more logical interfaces 35 (layer-3 outage) in line card 33. In one example, the logical interface 35 may include multiple T1 channels. The OMS 15 can also detect failure of a link 36 between either the router 16 and customer equipment 20 or a link 36 between the router 16 and a peer router 39. Failures are also detectable for a multiplexer (MUX), hub, or switch 37 or a link 38 between the MUX 37 and customer equipment 20. Failures can also be detected for the remote customer equipment 20.

An outage monitoring manager 40 in the OMS 15 locally monitors for these different failures and stores outage data 42 associated by with that outage monitoring and measurement. The outage data 42 can be accessed the NMS 12 or other tools for further correlation and calculation operations.

Figure 3:
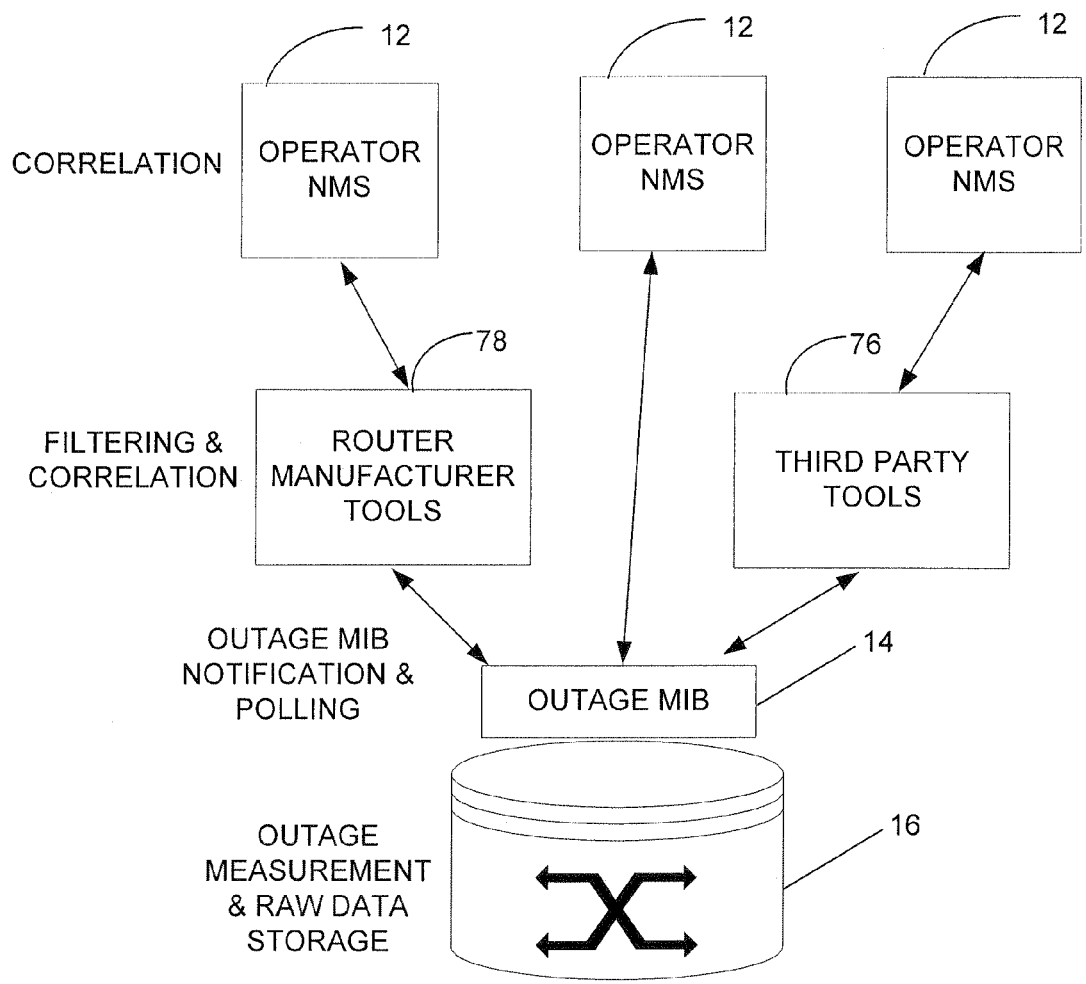
FIG. 3 is a block diagram showing how a multi-tiered scheme is used for outage measurement.

FIG. 3 shows how a hybrid two-tier approach is used for processing outages. A first tier uses the router 16 to autonomously and automatically perform local outage monitoring, measuring and raw outage data storage. A second tier includes router manufacturer tools 78, third party tools 76 and Network Management Systems (NMSs) 12 that either individually or in combination correlate and calculate outage values using the outage data in router 16.

An outage Management Information Base (MIB) 14 provides open access to the outage data by the different filtering and correlation tools 76, 78 and NMS 12. The correlated outage information output by tools 76 and 78 can be used in combination with NMS 12 to identify outages. In an alternative embodiment the NMS 12 receives the raw outage data directly from the router 16 and then does any necessary filtering and correlation. In yet another embodiment, some or all of the filtering and correlation is performed locally in the router 16, or another work station, then transferred to NMS 12.

Outage event filtering operations may be performed as close to the outage event sources as possible to reduce the processing overhead required in the IP network and reduce the system resources required at the upper correlation layer. For example, instead of sending failure indications for many logical interfaces associated with the same line card, the OMS 15 in router 16 may send only one notification indicating a failure of the line card. The outage data stored within the router 16 and then polled by the NMS 12 or other tools. This avoids certain data loss due to unreliable network transport, link outage, or link congestion.

The outage MIB 14 can support different tools 76 and 78 that perform outage calculations such as Mean Time Between Failure (MTBF), Mean Time To Repair (MTTR), and availability per object, device or network. The outage MIB 14 can also be used for customer Service Level Agreement (SLA) analysis.

Figure 4A:
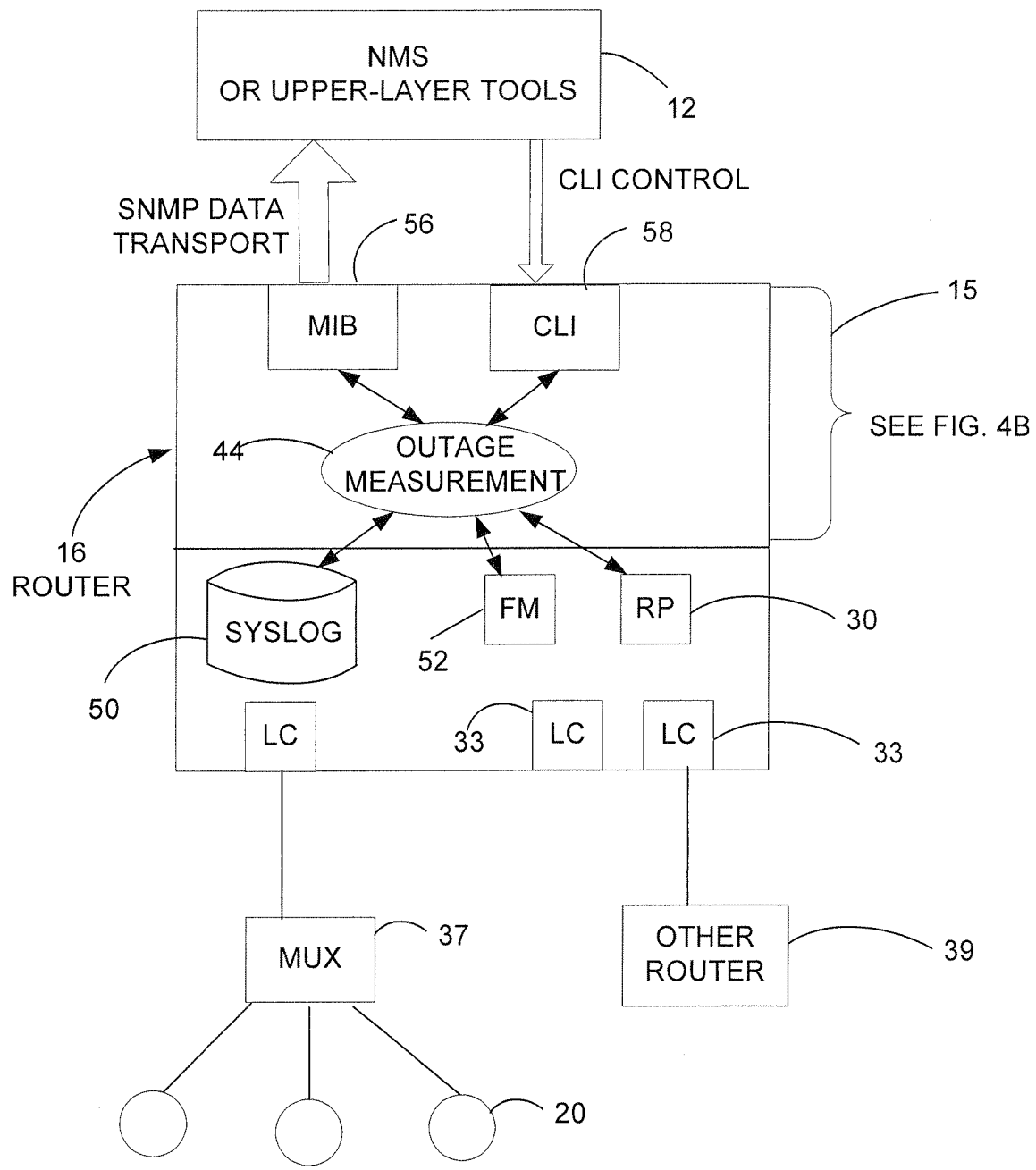
FIG. 4A shows the different function elements of the OMS.
Figure 4B:
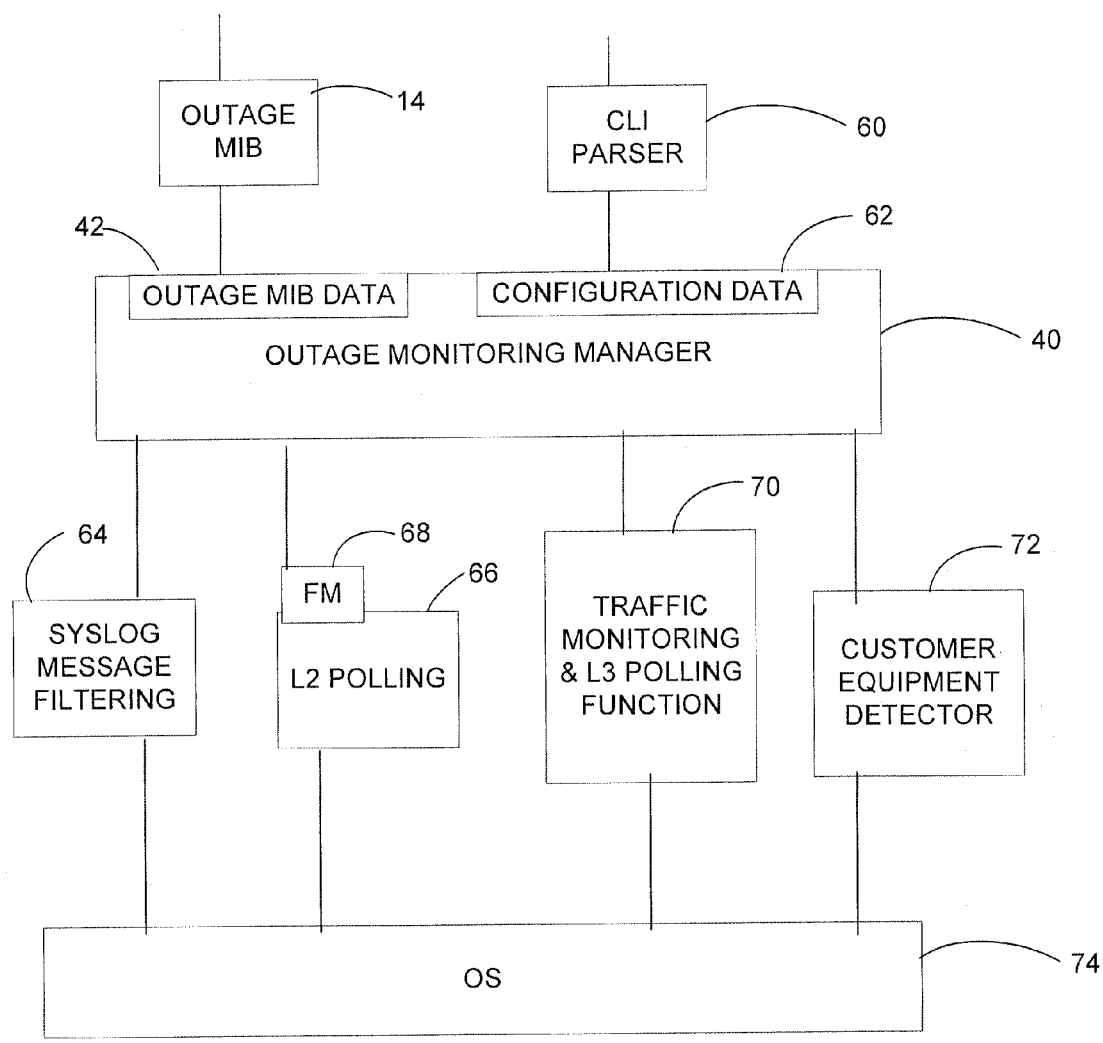
FIG. 4B shows the different functional elements of the OMS.

FIGS. 4A and 4B show the different functional elements of the OMS 15 operating inside the router 16. Outage measurements 44 are obtained from a router system log 50, Fault Manager (FM) 52, and router processor 30. The outage measurements 44 are performed according to configuration data 62 managed over a Command Line Interface 58. The CLI commands and configuration information is sent from the NMS 12 or other upper-layer outage tools. The outage data 42 obtained from the outage measurements 44 is managed and transferred through MIB 56 to one or more of the NMSs 12 or other upper-layer tools.

The outage measurements 44 are controlled by an outage monitoring manager 40. The configuration data 62 is generated through a CLI parser 60. The MIB 56 includes outage MIB data 42 transferred using the outage MIB 14.

The outage monitoring manager 40 conducts system log message filtering 64 and Layer-2 (L2) polling 66 from the router Operating System (OS) 74 and an operating system fault manager 68. The outage monitoring manager 40 also controls traffic monitoring and Layer-3 (L3) polling 70 and customer equipment detector 72.

Outage MIB Data Structure

Figure 5:
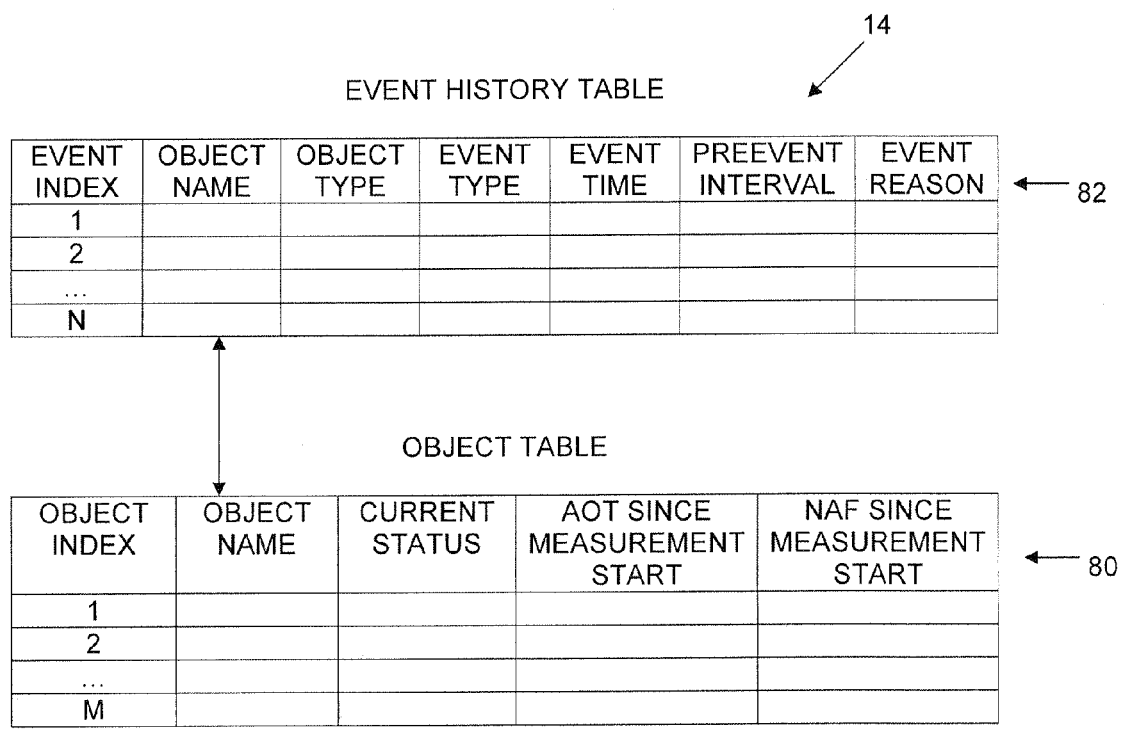
FIG. 5 shows an event history table and an object outage table used in the OMS.

FIG. 5 shows in more detail one example of the outage MIB 14 previously shown in FIG. 4. In one example, an object outage table 80 and an event history table 82 are used in the outage MIB 14. The outage MIB 14 keeps track of outage data in terms of Accumulated Outage Time (AOT) and Number of Accumulated Failures (NAF) per object.

The Outage MIB 14 maintains the outage information on a per-object basis so that the NMS 12 or upper-layer tools can poll the MIB 14 for the outage information for objects of interest. The number of objects monitored is configurable, depending on the availability of router memory and performance tradeoff considerations. Table 1.0 describes the parameters in the two tables 80 and 82 in more detail.

TABLE 1.0

Outage MIB data structure

| Outage MIB Variables | Table Type | Description/Comment |
|---|---|---|
| Object Name | History/Object | This object contains the identification of the monitoring object. The object name is string. For example, the object name can be the slot number '3', controller name '3/0/0', serial interface name |

TABLE 1.0-continued

Outage MIB data structure

| Outage MIB Variables | Table Type | Description/Comment |
| --- | --- | --- |
| Object Type | History | '3/0/0/2:0', or process ID. The name value must be unique. Represents different outage event object types. The types are defined as follows: routerObject: Bow level failure or recovery. rpslotObject: A route process slot failure or recovery. lcslotObject: A linecard slot failure or recovery. layer2InterfaceObject: A configured local interface failure or recovery. For example, controller or serial interface objects. layer3IPObject: A remote layer 3 protocol failure or recovery. Foe example, ping failure to the remote device. protocolSwObject: A protocol process failure or recovery, which causes the network outage. For example, BGP protocol process failure, while RP is OK. |
| Event Type | History | Object which identifies the event type such as failureEvent(1) or recoveryEvent(2). |
| Event Time | History | Object which identifies the event time. It uses the so-called 'UNIX format'. It is stored as a 32-bit count of seconds since 0000 UTC, 1 Jan., 1970." |
| Pre-Event Interval | History | Object which identifies the time duration between events. If the event is recovery, the interval time is TTR (Time To Recovery). If the event is failure, the interval time is TTF (Time To Failure). |
| Event Reason | History | Indicates potential reason(s) for an object up/down event. Such reasons may include, for example, Online Insertion Removal (OIR) and destination unreachable. |
| Current Status | Object | Indicates Current object's protocol status. interfaceUp(1) and interfaceDown(2) |
| AOT Since Measurement Start | Object | Accumulated Outage Time on the object since the outage measurement has been started. AOT is used to calculate object availability and DPM(Defects per Million) over a period of time. AOT and NAF are used to determine object MTTR(Mean Time To Recovery), MTBF(Mean Time Between Failure), and MTTF(Mean Time To Failure). |
| NAF Since Measurement Start | Object | Indicates Number of Accumulated Failures on the object since the outage measurement has been started. AOT and NAF are used to determine object MTTR(Mean Time To Recovery), MTBF(Mean Time Between Failure), and MTTF(Mean Time To Failure) |

An example of an object outage table 80 is illustrated in table 2.0. As an example, a "FastEthernet0/0/0" interface object is currently up. The object has 7-minutes of Accumulated Outage Time (AOT). The Number of Accumulated Failures (NAF) is 2.

TABLE 2.0

Object Outage Table

| Object Index | Object Name | Current Status | AOT Since Measurement Start | NAF Since Measurement Start |
| --- | --- | --- | --- | --- |
| 1 | FastEthernet0/0/0 | Up | 7 | 2 |
| 2 | | | | |
| ... | | | | |
| M | | | | |

AOT: Accumulated Outage Time
NAF: Number of Accumulated Failures

The size of the object outage table 80 determines the number of objects monitored. An operator can select which, and how many, objects for outage monitoring, based on application requirements and router resource (memory and CPU) constraints. For example, a router may have 10,000 customer circuits. The operator may want to monitor only 2,000 of the customer circuits due to SLA requirements or router resource constraints.

The event history table 82 maintains a history of outage events for the objects identified in the object outage table. The size of event history table 82 is configurable, depending on the availability of router memory and performance tradeoff considerations. Table 3.0 shows an example of the event history table 82. The first event recorded in the event history table shown in table 3.0 is the shut down of an interface object "Serial3/0/0/1:0" at time 13:28:05. Before the event, the interface was in an "Up" state for a duration of 525600 minutes.

TABLE 3.0

Event History Table in Outage MIB

| Event Index | Object Name | Object Type | Event Type | Event Time | PreEvent Interval | Event Reason |
|---|---|---|---|---|---|---|
| 1 | Serial3/0/0/1:0 | Serial | InterfaceDown | 13:28:05 | 525600 | Interface Shut |
| 2 | | | | | | |
| ... | | | | | | |
| N | | | | | | |

The event history table 82 is optional and the operator can decide if the table needs to be maintained or not, depending on application requirements and router resource (memory and CPU) constraints.

Configuration

Figure 6:
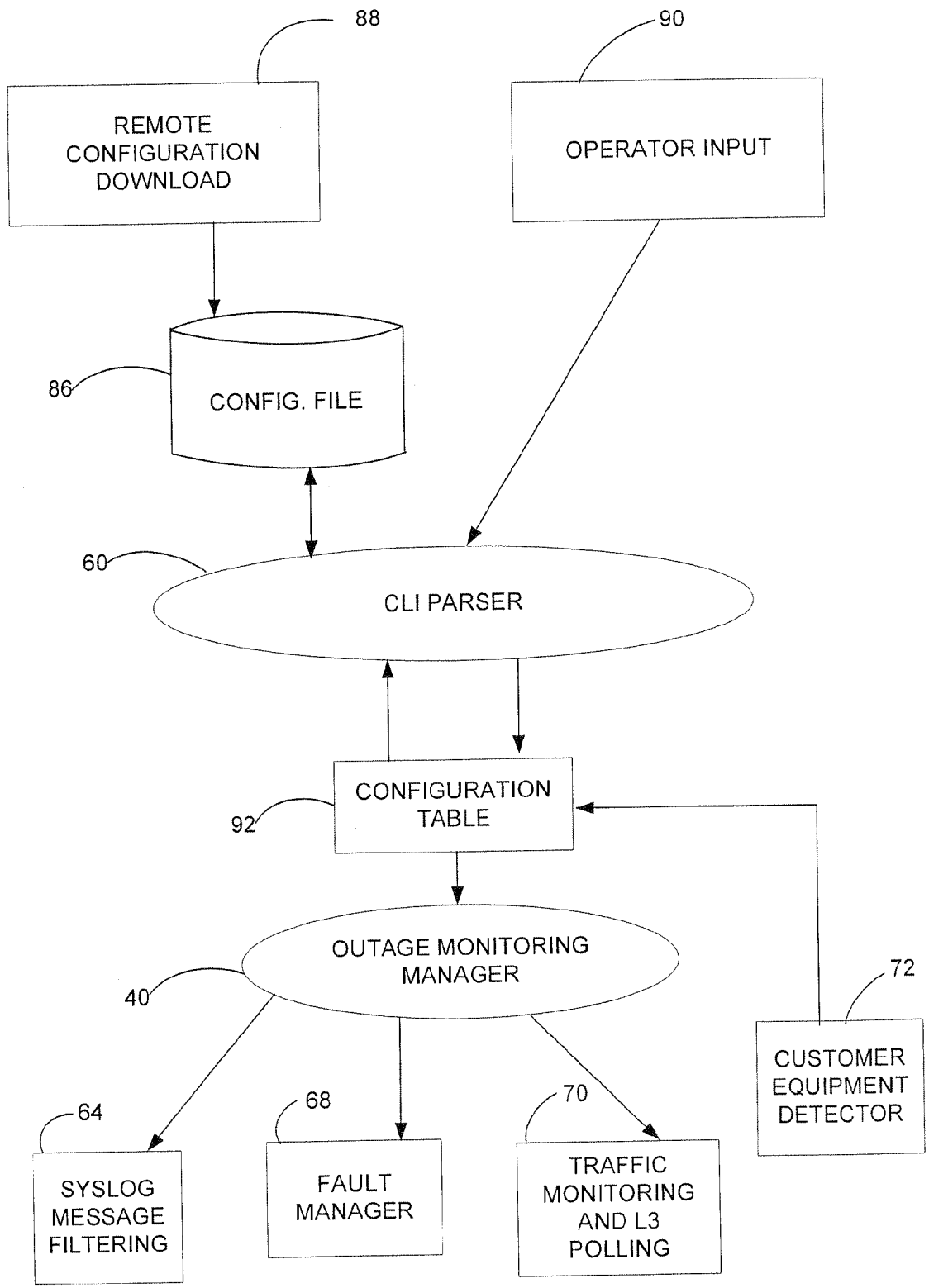
FIG. 6 shows how a configuration table and configuration file are used in the OMS.

FIG. 6 shows how the OMS is configured. The router 16 maintains a configuration table 92 which is populated either by a configuration file 86 from the NMS 12, operator inputs 90, or by customer equipment detector 72. The configuration table 92 can also be exported from the router 16 to the NMS 12.

Table 4.0 describes the types of parameters that may be used in the configuration table 92.

TABLE 4.0

Configuration Table Parameter Definitions

| Parameters | Definition |
|---|---|
| L2 Object ID | Object to be monitored |
| Process ID | SW process to be monitored |
| L3 Object ID | IP address of the remote customer device |
| Ping mode | Enabled/Disabled active probing using ping |
| Ping rate | Period of pinging the remote customer device |

The configuration file 86 can be created either by a remote configuration download 88 or by operator input 90. The CLI parser 60 interprets the CLI commands and configuration file 86 and writes configuration parameters similar to those shown in table 4.0 into configuration table 92.

Outage Management Commands

The operator input 90 is used to send commands to the outage monitoring manager 40. The operator inputs 90 are used for resetting, adding, removing, enabling, disabling and quitting different outage operations. An example list of those operations are described in table 5.0.

TABLE 5.0

Outage Management Commands

| Command | Explanation |
|---|---|
| start-file filename | start outage measurement process with configuration file |
| start-default | start outage measurement process without configuration file |
| add object | add an object to the outage measurement entry |
| group-add filename | add multiple objects with configuration file |
| remove object | remove an object from the outage measurement entry |
| group-remove filename | remove multiple objects with configuration file |
| ping-enable objectID/all rate | enable remote customer device ping with period |

TABLE 5.0-continued

Outage Management Commands

| Command | Explanation |
|---|---|
| period | |
| ping-disable objectID/all | disable remote customer device ping |
| auto-discovery enable | enable customer device discovery function |
| auto-discovery disable | disable customer device discovery function |
| export filename | export current entry table to the configuration file |
| Quit | stop outage measurement process |

Figure 7:
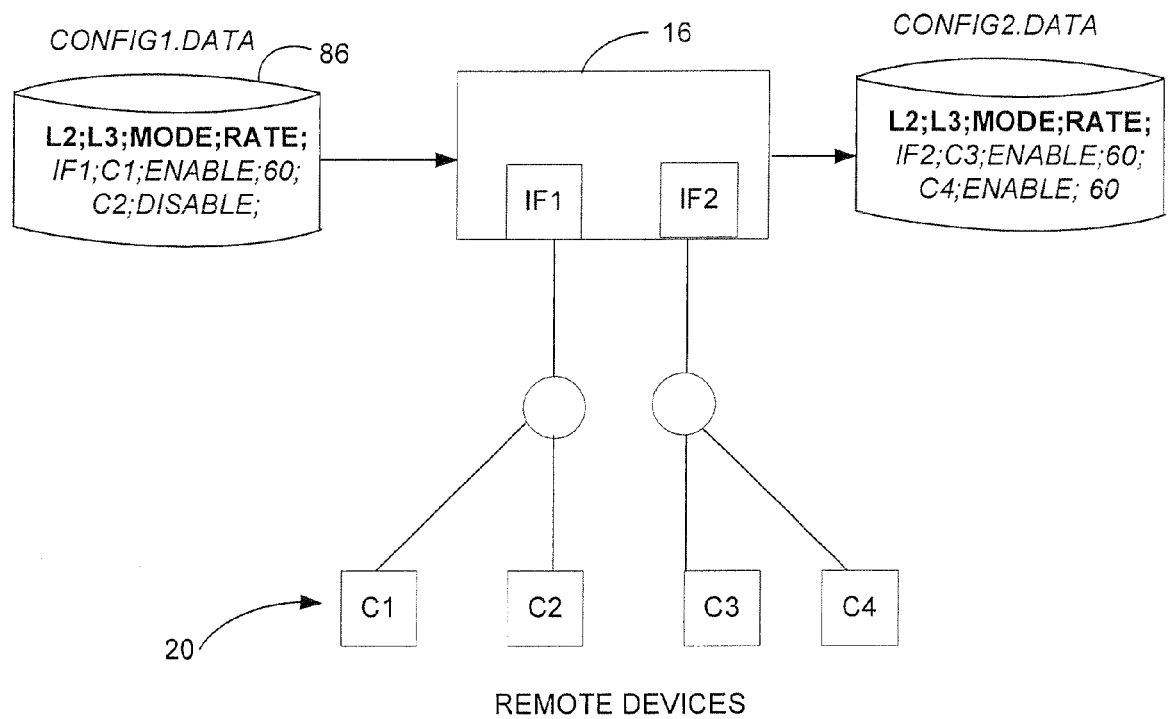
FIG. 7 shows one example of how commands are processed by the OMS.

FIG. 7 shows an example of how the outage management commands are used to control the OMS 15. A series of commands shown below are sent from the NMS 12 to the OMS 15 in the router 16.

(1) start-file config1.data, (2) add IF2, (3) auto-discovery enable;

(4) ping-enable all rate 60;

(5) remove IF1; and (6) export config2.data

In command (1), a start file command is sent to the router 16 along with a configuration file 86. The configuration file 86 directs the outage monitoring manager 40 to start monitoring interface IF1 and enables monitoring of remote customer router C1 for a 60 second period. The configuration file 86 also adds customer router C2 to the configuration table 92 (FIG. 6) but disables testing of router C2.

In command (2), interface IF2 is added to the configuration table 92 and monitoring is started for interface IF2. Command (3) enables an auto-discovery through the customer equipment detector 72 shown in FIG. 6. Customer equipment detector 72 discovers only remote router devices C3 and C4 connected to router 16 and adds them to the configuration table 92. Monitoring of customer routers C3 and C4 is placed in a disable mode. Auto-discovery is described in further detail below.

Command (4) initiates a pinging operation to all customer routers C1, C2, C3 and C4. This enables pinging to the previously disabled remote routers C2, C3, and C4. Command (5) removes interface IF1 as a monitoring entry from the configuration table 92. The remote devices C1 and C2 connected to IF1 are also removed as monitoring entries from the configuration table 92. Command (6) exports the current entry (config2.data) in the configuration file 86 to the NMS 12 or some other outage analysis tool. This includes layer-2 and layer-3, mode, and rate parameters.

Automatic Customer Equipment Detection

Referring back to FIG. 6, customer equipment detector 72 automatically searches for a current configuration of network devices connected to the router 16. The identified configuration is then written into configuration table 92. When the outage monitoring manager 40 is executed, it tries to open configuration table 92. If the configuration table 92 does not exist, the outage monitoring manager 40 may use customer equipment detector 72 to search all the line cards and interfaces in the router 16 and then automatically create the configuration table 92. The customer equipment detector 72 may also be used to supplement any objects already identified in the configuration table 92. Detector 72 when located in a core router can be used to identify other connected core routers, switches or devices.

Any proprietary device identification protocol can be used to detect neighboring customer devices. If a proprietary protocol is not available, a ping broadcast can be sued to detect neighboring customer devices. Once customer equipment detector 72 sends a ping broadcast request message to adjacent devices within the subnet, the neighboring devices receiving the request send back a ping reply message. If the source address of the ping reply message is new, it will be stored as a new remote customer device in configuration table 92. This quickly identifies changes in neighboring devices and starts monitoring customer equipment before the updated static configuration information becomes available from the NMS operator.

The customer equipment detector 72 shown in FIGS. 4 and 6 can use various existing protocols to identify neighboring devices. For example, a Cisco Discovery Protocol (CDP), Address Resolution Protocol (ARP) protocol, Internet Control Message Protocol (ICMP) or a traceroute can be used to identify the IP addresses of devices attached to the router 16. The CDP protocol can be used for Cisco devices and a ping broadcast can be used for non-Cisco customer premise equipment.

Layer-2 Polling

Referring to FIGS. 4 and 6, a Layer-2 (L2) polling function 66 polls layer-2 status for local interfaces between the router 16 and the customer equipment 20. Layer-2 outages in one example are measured by collecting UP/DOWN interface status information from the syslog 50. Layer-2 connectivity information such as protocol status and link status of all customer equipment 20 connected to an interface can be provided by the router operating system 74.

If the OS Fault Manger (FM) 68 is available on the system, it can detect interface status such as "interface UP" or "interface DOWN". The outage monitoring manager 40 can monitor this interface status by registering the interface ID. When the layer-2 polling is registered, the FM 68 reports current status of the interface. Based on the status, the L2 interface is registered as either "interface UP" or "interface DOWN" by the outage monitoring manager 310.

If the FM 68 is not available, the outage monitoring manager 40 uses its own layer-2 polling 66. The outage monitoring manager 40 registers objects on a time scheduler and the scheduler generates polling events based on a specified polling time period. In addition to monitoring layer-2 interface status, the layer-2 polling 66 can also measure line card failure events by registering the slot number of the line card 33.

Layer-3 Polling

In addition to checking layer-2 link status, layer-3 (L3) traffic flows such as "input rate", "output rate", "output queue packet drop", and "input queue packet drop" can optionally be monitored by traffic monitoring and L3 polling function 70. Although layer-2 link status of an interface may be "up", no traffic exchange for an extended period of time or dropped packets for a customer device, may indicate failures along the path.

Two levels of layer-3 testing can be performed. A first level identifies the input rate, output rate and output queue packet drop information that is normally tracked by the router operating system 74. However, low packets rates could be caused by long dormancy status. Therefore, an additional detection mechanism such as active probing (ping) is used in polling function 70 for customer devices suspected of having layer-3 outages. During active probing, the OMS 15 sends test packets to devices connected to the router 16. This is shown in more detail in FIG. 11A.

The configuration file 86 (FIG. 6) specifies if layer-3 polling takes place and the rate in which the ping test packets are sent to the customer equipment 20. For example, the ping-packets may be sent wherever the OS 74 indicates no activity on a link for some specified period of time. Alternatively, the test packets may be periodically sent from the access router 16 to the customer equipment 20. The outage monitoring manager 40 monitors the local link to determine if the customer equipment 20 sends back the test packets.

Outage Monitoring Examples

The target of outage monitoring is referred to as "object", which is a generalized abstraction for physical and logical interfaces local to the router 16, logical links in-between the router 16, customer equipment 20, peer routers 39 (FIG. 2), remote interfaces, linecards, router processor(s), or software processes.

The up/down state, Accumulated Outage Time since measurement started (AOT); and Number of Accumulated Failures since measurement started (NAF) object states are monitored from within the router 16 by the outage monitoring manager 40. The NMS 12 or higher-layer tools 78 or 76 (FIG. 3) then use this raw data to derive and calculate information such as object Mean Time Between Failure (MTBF), Mean Time To Repair (MTTR), and availability. Several application examples are provided below.

Figure 8:
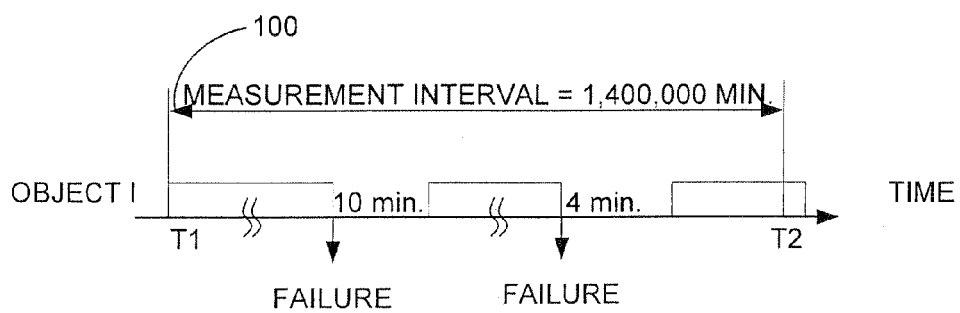
FIG. 8 shows how an Accumulated Outage Time (AOT) is used for outage measurements.

Referring to FIG. 8, the outage monitoring manager 40 measures the up or down status of an object for some period from time T1 to time T2. In this example, the period of time is 1,400,000 minutes. During this time duration, the outage monitoring manager 40 automatically determines the duration of any failures for the monitored object. Time to Repair (TTR), Time Between Failure (TBF), and Time To Failure (TTF) are derived by the outage monitoring manager 40.

In the example in FIG. 8, a first outage is detected for object i that lasts for 10 minutes and a second outage is detected for object i that lasts 4 minutes. The outage monitoring manager 40 in the router 16 calculates the $AOT_i$=10 minutes+4 minutes=14 minutes. The AOT information is transferred to the NMS 12 or higher level tool that then calculates the object Availability (Ai) and Defects Per Million (DPM). For example, for a starting time T1 and ending time T2, the availability $A_i=1-AOT_i/(T2-T1)=1-14/1,400,000=99.999\%$. The $DPM_i=[AOT_i/(T2-T1)] \times 10^{6}=10$ DPM.

There are two different ways that the outage monitoring manager 40 can automatically calculate the $AOT_i$. In one scheme, the outage monitoring manager 40 receives an interrupt from the router operating system 74 (FIG. 4) each time a failure occurs and another interrupt when the object is back up. In a second scheme, the outage monitoring manager 40 constantly polls the object status tracking for each polling period whether the object is up or down.

Figure 9:
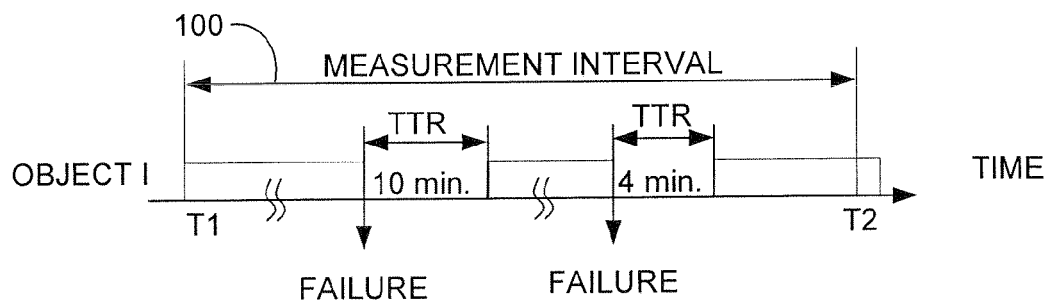
FIG. 9 shows how a Number of Accumulated Failures (NAF) is used for outage measurements.

FIG. 9 shows one example of how the Mean Time To Repair (MTTR) is derived by the NMS 12 for an object i. The outage monitoring manager 40 counts the Number of Accumulated Failures (NAFi) during a measurement interval 100. The AOTi and NAFi values are transferred to the NMS 12 or higher level tool. The NMS 12, or a higher level tool, then calculates MTTRi=AOTi/NAFi=14/2=7 min.

Figure 10:
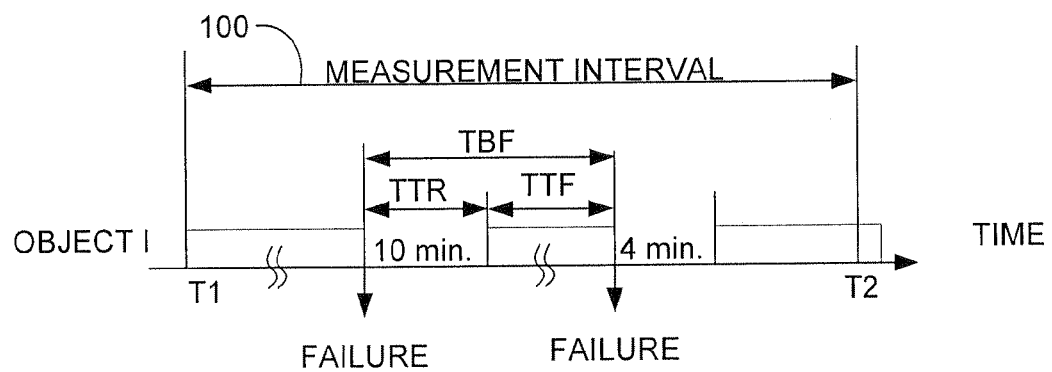
FIG. 10 shows how a Mean Time Between Failures (MTBF) and a Mean Time To Failure (MTTF) are calculated from OMS outage data.

FIG. 10 shows how the NMS 12 or higher level tool uses AOT and NAF to determine the Mean Time Between Failure (MTBF) and Mean Time To Repair (MTTF) for the object i from the NAFi information where;

$MTBFi=(T2-T1)/NAFi$; and $MTTFi=MTBFi-MTTRi$.

Figure 11A:
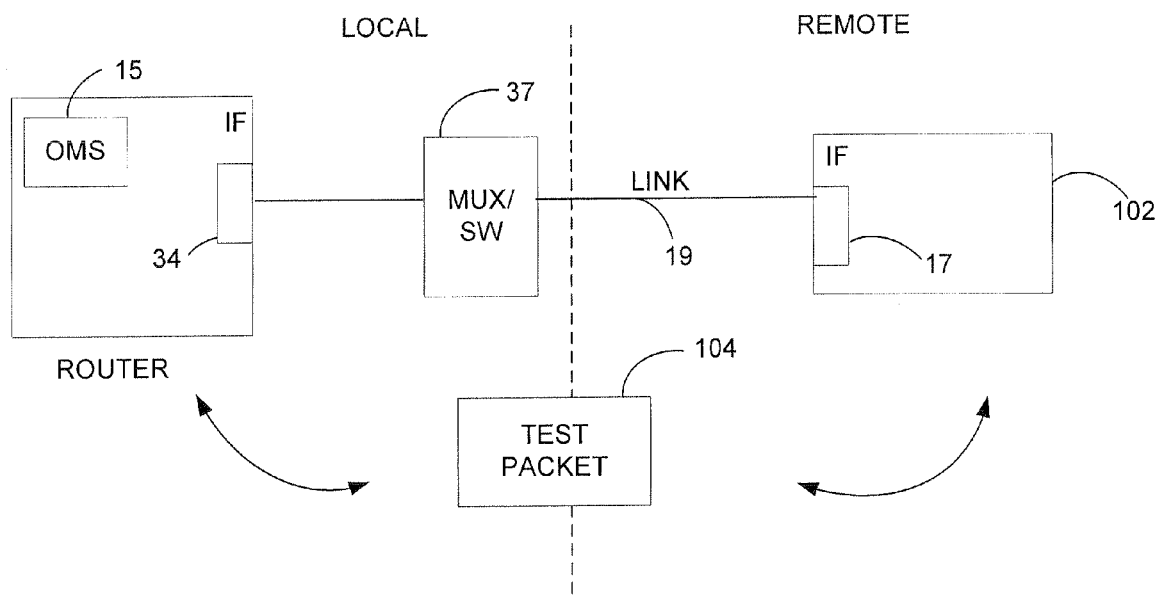
FIGS. 11A and 11B show how local outages are distinguished from remote outages.

A vendor or network processing equipment or the operator of network processing equipment may be asked to sign a Service Level Agreement (SLA) guaranteeing the network equipment will be operational for some percentage of time. FIG. 11A shows how the AOT information generated by the outage monitoring manager 40 is used to determine if equipment is meeting SLA agreements and whether local or remote equipment is responsible for an outage.

In FIG. 11A, the OMS 15 monitors a local interface object 34 in the router 16 and also monitors the corresponding remote interface object 17 at a remote device 102. The remote device 102 can be a customer router, peer router, or other network processing device. The router 16 and the remote device 102 are connected by a single link 19.

Figure 11B:
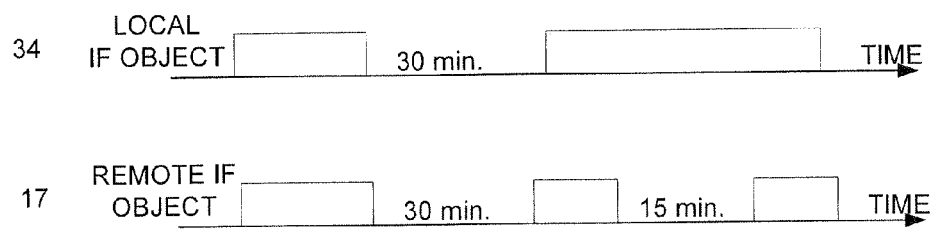

In one example, the local interface object 34 can be monitored using a layer-2 polling of status information for the physical interface. In this example, the remote interface 17 and remote device 102 may be monitored by the OMS 15 sending a test packet 104 to the remote device 102. The OMS 15 then monitors for return of the test packet 104 to router 16. The up/down durations of the local interface object 34 and its corresponding remote interface object 17 are shown in FIG. 11B.

The NMS 12 correlates the measured AOT's from the two objects 34 and 17 and determines if there is any down time associated directly with the remote side of link 19. In this example, the $AOT_{34}$ of the local IF object 34=30 minutes and the $AOT_{17}$ of the remote IF object 17=45 minutes. There is only one physical link 19 between the access router 16 and the remote device 102. This means that any outage time beyond the 30 minutes of outage time for IF 34 is likely caused by an outage on link 19 or remote device 102. Thus, the NMS 12 determines the AOT of the remote device 102 or link 19= (AOT remote IF object 17)−(AOT local IF object 34)=15 minutes.

It should be understood, that IF 34 in FIG. 11A may actually have many logical links coupled between itself and different remove devices. The OMS 15 can monitor the status for each logical interface or link that exists in router 16. By only pinging test packets 104 locally between the router 16 and its neighbors, there is much less burden on the network bandwidth.

Potential reason(s) for an object up/down event may be logged and associated with the event. Such reasons may include, for example, Online Insertion Removal (OIR) and destination unreachable.

Event Filtering

Simple forms of event filtering can be performed within the router 16 to suppress "event storms" to the NMS 12 and to reduce network/NMS resource consumption due to the event storms. One example of an event storm and event storm filtering may relate to a line card failure. Instead of notifying the NMS 12 for tens or hundreds of events of channelized interface failures associated with the same line card, the outage monitoring manager 40 may identify all of the outage events with the same line card and report only one LC failure event to the NMS 12. Thus, instead of sending many failures, the OMS 15 only sends a root cause notification. If the root-cause event needs to be reported to the NMS 12, event filtering would not take place. Event filtering can be rule-based and defined by individual operators.

Resolution

Resolution refers to the granularity of outage measurement time. There is a relationship between the outage time resolution and outage monitoring frequency when a polling-based measurement method is employed. For example, given a one-minute resolution of customer outage time, the outage monitoring manager 40 may poll once every 30 seconds. In general, the rate of polling for outage monitoring shall be twice as frequent as the outage time resolution. However, different polling rates can be selected depending on the object and desired resolution.

Pinging Customer Or Peer Router Interface

As described above in FIG. 11A, the OMS 15 can provide a ping function (sending test packets) for monitoring the outage of physical and logical links between the measuring router 16 and a remote device 102, such as a customer router or peer router. The ping function is configurable on a per-object basis so the user is able to enable/disable pinging based on the application needs.

The configurability of the ping function can depend on several factors. First, an IP Internet Control Message Protocol (ICMP) ping requires use of the IP address of the remote interface to be pinged. However, the address may not always be readily available, or may change from time to time. Further, the remote device address may not be obtainable via such automated discovery protocols, since the remote device may turn off discovery protocols due to security and/or performance concerns. Frequent pinging of a large number of remote interfaces may also cause router performance degradation.

To avoid these problems, pinging may be applied to a few selected remote devices which are deemed critical to customer's SLA. In these circumstances, the OMS 15 configuration enables the user to choose the Ping function on a per-object basis as shown in table 4.0.

Certain monitoring mechanisms and schemes can be performed to reduce overhead when the ping function is enabled. Some of these basic sequences include checking line card status, checking physical link integrity, checking packet flow statistics. Then, if necessary, pinging remote interfaces at remote devices. With this monitoring sequence, pinging may become the last action only if the first three measurement steps are not properly satisfied.

Outage Data Collection

Figure 12:
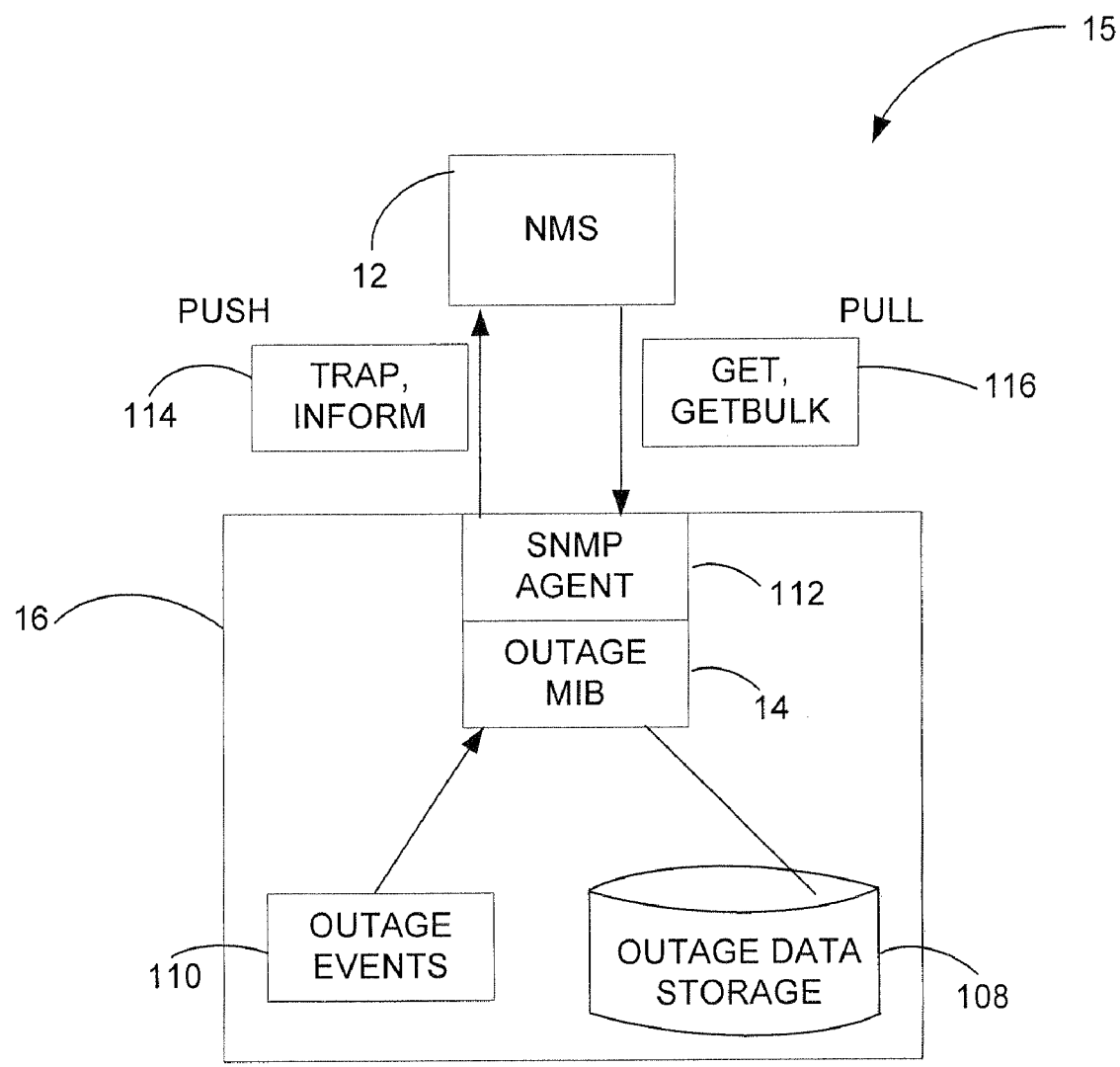
FIG. 12 shows how outage data is transferred to a Network Management System (NMS).

Referring to FIG. 12, the OMS 15 collects measured outage data 108 for the NMS 12 or upper-layer tools 76 or 78 (FIG. 3). The OMS 15 can provide different data collection functions, such as event-based notification, local storage, and data access.

The OMS 15 can notify NMS 12 about outage events 110 along with associated outage data 108 via a SNMP-based "push" mechanism 114. The SNMP can provide two basic notification functions, "trap" and "inform" 114. Of course other types of notification schemes can also be used. Both the trap and inform notification functions 114 send events to NMS 12 from an SNMP agent 112 embedded in the router 16. The trap function relies on an User Datagram Protocol (UDP) transport that may be unreliable. The inform function uses an UDP in a reliable manner through a simple request-response protocol.

Through the Simple Network Management Protocol (SNMP) and MIB 14, the NMS 12 collects raw outage data either by event notification from the router 16 or by data access to the router 16. With the event notification mechanism, the NMS 12 can receive outage data upon occurrence of outage events. With the data access mechanism, the NMS 12 reads the outage data 108 stored in the router 16 from time to time. In other words, the outage data 108 can be either pushed by the router 16 to the NMS 12 or pulled by the NMS 12 from the router 16.

The NMS 12 accesses, or polls, the measured outage data 108 stored in the router 16 from time to time via a SNMP-based "pull" mechanism 116. SNMP provides two basic access functions for collecting MIB data, "get" and "getbulk". The get function retrieves one data item and the getbulk function retrieves a set of data items.

Measuring Router Crashes

Figure 13:
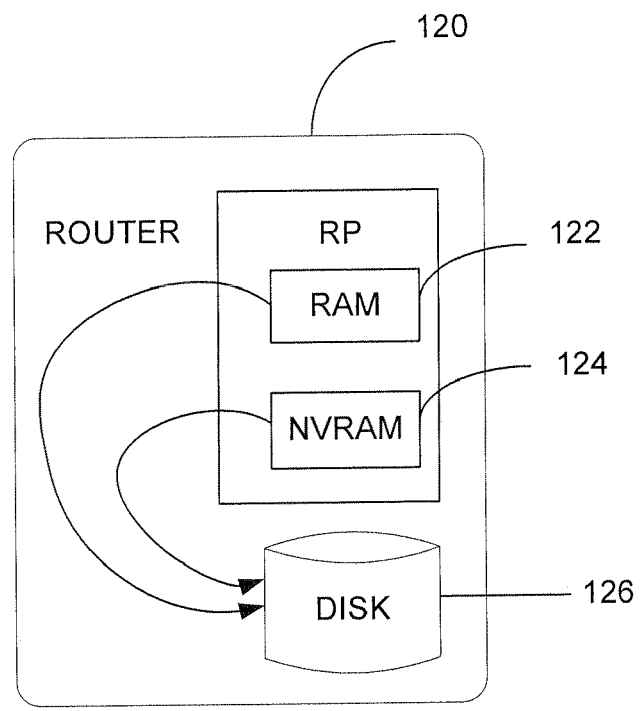
FIG. 13 is a diagram showing how router processor-to-disk check pointing is performed by the OMS.

Referring to FIG. 13, the OMS 15 can measure the time and duration of "soft" router crashes and "hard" router crashes. The entire router 120 may crash under certain failure modes. A "Soft" router crash refers to the type of router failures, such as a software crash or parity error-caused crash, which allows the router to generate crash information before the router is completely down. This soft crash information can be produced with a time stamp of the crash event and stored in the non-volatile memory 124. When the system is rebooted, the time stamp in the crash information can be used to calculate the router outage duration.

"Hard" router crashes are those under which the router has no time to generate crash information. An example of hard crash is an instantaneous router down due to a sudden power loss. One approach for capturing the hard crash information employs persistent storage, such as non-volatile memory 124 or disk memory 126, which resides locally in the measuring router 120.

With this approach, the OMS 15 periodically writes system time to a fixed location in the persistent storage 124 or 126. For example, every minute. When the router 120 reboots from a crash, the OMS 15 reads the time stamp from the persistent storage device 124 or 126. The router outage time is then within one minute after the stamped time. The outage duration is then the interval between the stamped time and the current system time.

This eliminates another network processing device from having to periodically ping the router 120 and using network bandwidth. This method is also more accurate than pinging, since the internally generated time stamp more accurately represents the current operational time of the router 120.

Another approach for measuring the hard crash has one or more external devices periodically poll the router 120. For example, NMS 12 (FIG. 1) or neighboring router(s) may ping the router 120 under monitoring every minute to determine its availability.

Local Storage

The outage information can also be stored in redundant memory 124 or 126, within the router 120 or at a neighboring router, to avoid the single point of storage failure. The outage data for all the monitored objects, other than router 120 and the router processor object 121, can be stored in volatile memory 122 and periodically polled by the NMS.

The outage data of all the monitored objects, including router 120 and router processor objects 121, can be stored in either the persistent non-volatile memory 124 or disk 126, when storage space and run-time performance permit.

Storing outage information locally in the router 120 increases reliability of the information and prevents data loss when there are outages or link congestion in other parts of the network. Using persistent storage 124 or 126 to store outage information also enables measurement of router crashes.

When volatile memory 122 is used for outage information storage, the NMS or other devices may poll the outage data from the router 120 periodically, or on demand, to avoid outage information loss due to the failure of the volatile memory 122 or router 120. The OMS 15 can use the persistent storage 124 or 126 for all the monitored objects depending on size and performance overhead limits.

Dual-Router Processor Checkpointing

Figure 14:
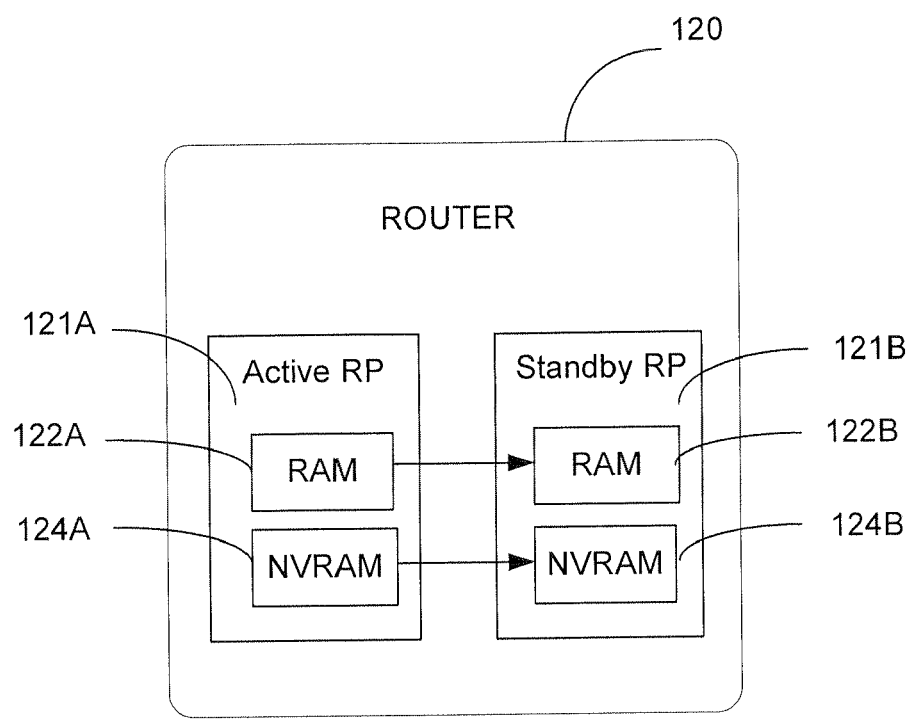
FIG. 14 is a diagram showing how router processor-to-router processor check pointing is performed by the OMS.

Referring to FIG. 14, some routers 120 may be configured with dual processors 121A and 121B. The OMS 15 may replicate the outage data from the active router processor storage 122A or 124A (persistent and non-persistent) to the standby storage 122B or 124B (persistent and non-persistent) for the standby router processor 121B during outage data updates.

This allows the OMS 15 to continue outage measurement functions after a switchover from the active processor 121A to the standby processor 121B. This also allows the router 120 to retain router crash information even if one of the processors 121A or 121B containing the outage data is physically replaced.

Outage Measurement Gaps

The OMS 15 captures router crashes and prevents loss of outage data to avoid outage measurement gaps. The possible outage measurement gaps are governed by the types of objects under the outage measurement. For example, a router processor (RP) object vs. other objects. Measurement gaps are also governed by the types of router crashes (soft vs. hard) and the types of outage data storage (volatile vs. persistent—nonvolatile memory or disk).

Table 6 summarizes the solutions for capturing the router crashes and preventing measurement gaps.

TABLE 6

| | | Capturing the Outage of Router Crashes | |
|---|---|---|---|
| | | When Persistent Storage Employed | |
| Events | When Volatile Memory Employed for objects other than RPs | for Router Processor (RP) objects only | for all the objects |
| Soft router crash | NMS poils the stored outage data periodically or on demand. | (1) IOS generates "Crashinfo" with the router outage time. The Crashinfo is stored in non-volatile storage. Or, | For the router and RP objects, OMS periodically writes system time to the persistent storage. |

TABLE 6-continued

Capturing the Outage of Router Crashes

| Events | When Volatile Memory Employed for objects other than RPs | When Persistent Storage Employed | |
|---|---|---|---|
| | | for Router Processor (RP) objects only | for all the objects |
| Hard router crash | | (2) OMS periodically writes system time to a persistent storage device to record the latest "I'm alive" time. (1) OMS periodically writes system time to a persistent storage device to record the latest "I'm alive" time. Or, (2) NMS or other routers periodically ping the router to assess its availability. | For all the other objects, OMS writes their outage data from RAM to the persistent storage up on outage events. |

Even if a persistent storage device is used, the stored outage data could potentially be lost due to single point of failure or replacement of the storage device. Redundancy is one approach for addressing the problem. Some potential redundancy solutions include data check pointing from the memory on the router processor to local disk (FIG. 13), data check pointing from the memory on the active router processor to the memory on the standby router processor (FIG. 14), or data check pointing from the router 120 to a neighboring router.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
one or more processors;
a memory coupled to the processors comprising instructions executable by the processors, the processors operable when executing the instructions to:
monitor for outages occurring locally at a network device that forwards communications sent from one or more remote endpoints located in a first network through the network device, to a second different network;
monitor for outages occurring remotely on first network links located in the first network;
identify outage information according to the local and remote monitoring;
send the outage information from the network device, over the second network to a remote system that is located outside the first network and that monitors for outages located on second network links that are located outside the first network;
generate time stamp values according to a configured period;
store the periodically generated time stamp values in a local storage;
when recovering from a local crash, compare a most recently stored time stamp value to a local current system time to determine an outage measurement for the local crash; and
include the outage measurement within the outage information.

2. The apparatus of claim 1, wherein the processors are located in the network device, and the network device is a single point-of-failure for messages originating in the first network and addressed to other endpoints located outside the first network.

3. The apparatus of claim 2, wherein the processors are further operable to filter a plurality of failures associated with a same element into a single root cause notification that is included in the outage information.

4. The apparatus of claim 2, wherein the processors are further operable to generate connectivity measurements and component operability measurements, the connectivity measurements and the component operability measurements for inclusion within the outage information.

5. The apparatus of claim 2 wherein the processors are further operable to perform the local and the remote outage monitoring according to configuration parameters sent from the remote system.

6. The apparatus of claim 5 wherein the received configuration parameters specify a pinging rate for pings sent from the network device.

7. The apparatus of claim 5 wherein the processors are further operable to identify neighboring devices using Cisco Discovery Protocol (CDP).

8. An apparatus comprising:
one or more processors;
a memory coupled to the processors comprising instructions executable by the processors, the processors operable when executing the instructions to:

exchange communications with a remote network device that forwards messages generated by one or more remote endpoints located in a first network through the remote network device and to a second different network;

receive outage information generated by the remote network device, the received outage information corresponding to the remote network device and to first network links located in the first network;

compare the received outage information to local outage information that corresponds to second different network links that are located outside the first network, the local outage information generated independently from monitoring performed by the remote network device;

identify failures on the first network links, the remote network device and the second different network links according to the comparison; and calculate a product of an accumulated outage time value that is included in the received outage information and an inverse of an accumulated number of failures that is included in the received outage information.

9. The apparatus of claim 8 wherein the remote network device is a single point of failure for the remote endpoints such that the processors that are located outside the first network cannot access the remote endpoints independently of the remote network device.

10. The apparatus of claim 8 wherein the processors are operable to calculate object availability using accumulated outage time values included in the received outage information.

11. The apparatus of claim 8 wherein the remote network device is a router or a switch.

12. The apparatus of claim 8 wherein the processors are further operable to send a communication to control pinging by the remote network device for generating the outage information.

13. The apparatus of claim 8 wherein the processors are further operable to output a mean time to repair.

14. An apparatus, comprising:
one or more processors;
a memory coupled to the processors comprising instructions executable by the processors, the processors operable when executing the instructions to:
monitor for outages occurring locally at a network device that is configured to forward communications sent over a first network by remote endpoints to a second network;
analyze an input rate, an output rate, an input queue packet drop and an output queue packet drop to identify at least one candidate remote endpoint for pinging, wherein the identified candidate remote endpoints are a subset of the remote endpoints;
ping the identified candidate endpoints to identify remote endpoints having outages;
identify first outage information according to the local and remote monitoring; and
send the first outage information from the network device to a remote system that is located outside the first network for combining with remotely-generated second outage information that identifies outages occurring between the network device and the remote system.

15. The apparatus of claim 14 wherein the first outage information, when combined with the second outage information, defines a completely monitored connection path extending from the remote endpoints, through the network device and to the remote system.

16. The apparatus of claim 14 wherein the processors are further operable to:
perform local monitoring by checking layer-2 link status for the network device; and
perform remote monitoring by checking layer-3 traffic flows between the remote endpoints and the network device.

17. The apparatus of claim 14 wherein the processors are further operable to monitor a software process responsive to a configuration signal sent from the remote system.

18. The apparatus of claim 14 wherein the processors select objects for remote monitoring according to configuration signals sent from the remote system.

19. An apparatus, comprising:
one or more processors;
a memory coupled to the processors comprising instructions executable by the processors, the processors operable when executing the instructions to:
identify a remote network device that is a single point of failure for an endpoint in a first network, the identified remote network device being a single point of exit for communications that are generated by the endpoint and addressed to a destination located outside the first network;
exchange command communications with the identified remote network device, the command communications to control monitoring by the remote network device of first objects located in the first network, said monitoring by the remote network device including sending pings from the remote network device to the first objects;
receive outage information generated by the remote network device according to the exchanged command communications;
monitor second objects located outside the first network, said monitoring of the second objects including sending pings from the apparatus to the second objects, and locally generate outage information according to the monitoring of the second objects; and
output a failure indication based on both the received outage information and the generated outage information, the failure indication identifying whether any communication disruptions affecting the endpoint correspond to failure of hardware operating outside the first network;
wherein the received outage information, when combined with the locally generated outage information, monitors an entire communication path extending from the endpoint located in the first network, through the network device and to the apparatus,
wherein the command communications control a start time for the monitoring by the remote network device.

20. The apparatus of claim 19 wherein the command communications control which ones of the objects in the first network are monitored by the remote network device.

21. The apparatus of claim 20 wherein the command communications control when the remote network device uses device discovery to maintain a listing of the first objects.

* * * * *